United States Patent [19]

Tisdale

[11] 4,413,609
[45] Nov. 8, 1983

[54] PORTABLE HIBACHI-TYPE CHARCOAL GRILL WITH KINDLING STRUCTURE

[76] Inventor: Reynold D. Tisdale, 2 Atlantic Ave., Hampton Beach, N.H. 03842

[21] Appl. No.: 878,164

[22] Filed: Feb. 15, 1978

[51] Int. Cl.³ .............................................. A47J 37/00
[52] U.S. Cl. ................................................ 126/25 R
[58] Field of Search ............. 126/25 R, 25 A, 25 AA, 126/25 B, 9 R

[56] References Cited

U.S. PATENT DOCUMENTS

| | | | |
|---|---|---|---|
| 280,245 | 6/1883 | Schrack | 126/25 R |
| 3,046,969 | 7/1962 | Davis | 126/25 R |
| 3,331,365 | 7/1967 | Sussan | 126/25 R |
| 3,353,527 | 11/1967 | Anderson | 126/25 R |
| 3,765,397 | 10/1973 | Henderson | 126/25 B |

*Primary Examiner*—Samuel Scott
*Assistant Examiner*—Wesley S. Ratliff, Jr.
*Attorney, Agent, or Firm*—Robert T. Dunn

[57] ABSTRACT

A portable Hibachi-type charcoal burning food grill has incorporated therewith a structure for kindling the charcoal and consists of two separate parts: the first part is a shallow upstanding Hibachi-type container for the charcoal, open at the top like a conventional Hibachi and also open at the bottom, the bottom opening being covered by a grate on which the charcoal is piled; and the second part is a tapered upstanding kindling enclosure below the Hibachi that may be integral with or separate from the Hibachi. When provided separately, the kindling enclosure is open at the top, tapers outward from the top to the bottom thereof and has a multitude of uniformly spaced air passage holes therein. The top of the separate kindling structure fits the bottom of the Hibachi so that flames from burning kindling material such as paper, in the kindling enclosure, fed by air flow through the spaced air passages therein flows upward through the opening in the bottom of the Hibachi and ignites the coals on the grate. When the coals are ignited, the Hibachi can be removed from the kindling enclosure and set on its legs if desired.

8 Claims, 10 Drawing Figures

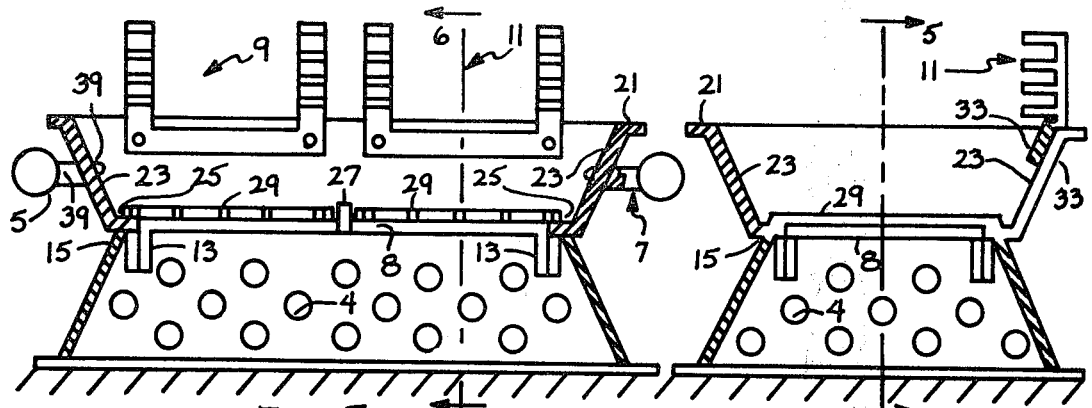
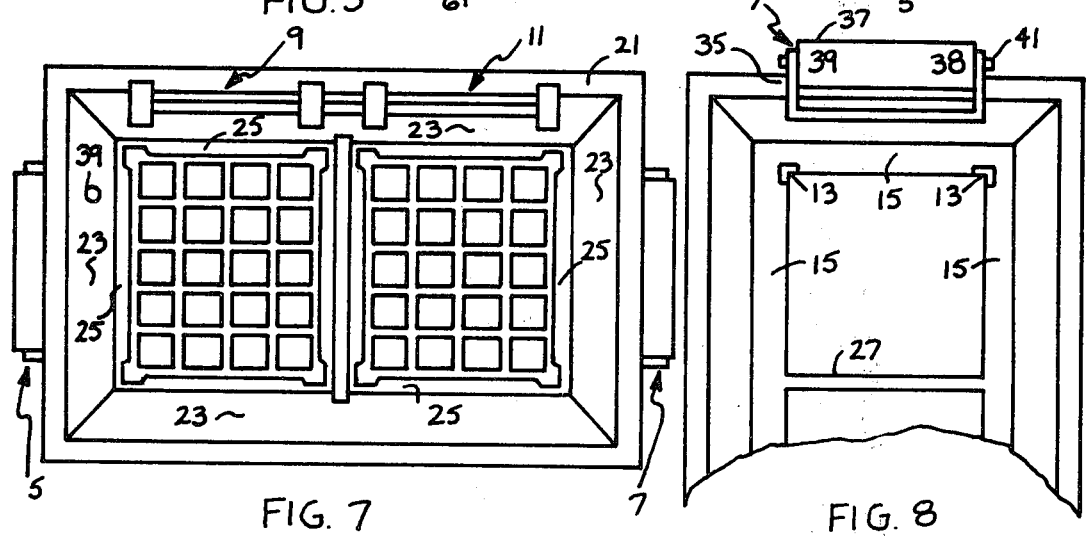
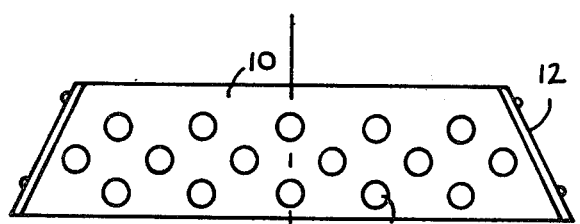
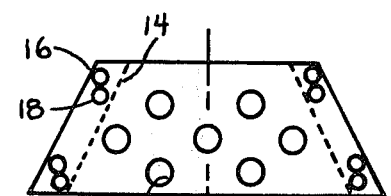

PORTABLE HIBACHI-TYPE CHARCOAL GRILL WITH KINDLING STRUCTURE

FIELD OF THE INVENTION

The present invention relates to portable outdoor charcoal cooking stoves and also to fuel ignition devices for use therewith.

BACKGROUND OF THE INVENTION

A variety of types and forms of outdoor cooking stoves or grills are known in the prior art and commercially available. These generally have a grill body that is adapted to contain a supply of charcoal briquets, supported on a grate with means for supporting a grill over the charcoal briquets, on which the food stuffs to be cooked are placed. In all such devices, it is desired to ignite the charcoal quickly and safely in an outdoor environment. Two techniques are commonly used to ignite the charcoal. Electrically heated starter rods are used powered by a 110 volts source, or a hydrocarbon liquid is poured over the briquets and lit with a match. Clearly, the electrical starter rods can be used only where 110 volt power is available and the ignition process using these rods is very slow. Ignition is faster using the hydrocarbon liquid, however, it is dangerous and the burning liquid produces smoke, objectionable odors and imparts an unpleasant taste to the food being cooked.

Some efforts have been made heretofore to provide ignitors for the charcoal briquets that burn newspapers or other kindling material. These devices usually taken the form of a tubular flue that extends downward from the bottom of a conventional outdoor barbecue grill and a door is provided at the bottom of the flue for removing ashes. This integral structure including the flue, the barbecue grill and the stand for supporting them is two to three feet high, stands on the ground and, while it is portable, it can hardly be placed in a backpack or in the trunk of some small cars; and it would be most inconvenient to set it on a table for use.

the barbecue grill and flue type igniter is cleaned by removing the charcoal and kindling ashes from the bottom of the flue and, usually, any remains of the charcoal that does not fall through the grate to the bottom of the flue must be removed (after cooling) from the grate. Rekindling the charcoal usually cannot be done except after first cleaning out the bottom of the flue and it is not at all convenient to separate unburned charcoal from charcoal ashes and use the charcoal again.

SUMMARY OF THE INVENTION

It is the principle object of the present invention to provide a relatively simple, inexpensive combination of an Hibachi-type portable charcoal grill and kindling structure in which kindling material such as paper can be burned to ignite charcoal briquets in the Hibachi and when the briquets are ignited the Hibachi can be used in a conventional manner on a table, stand or on the ground to grill food.

It is another object of the present invention to provide a portable outdoor charcoal stove or grill in combination with a kindling structure for kindling the charcoal using readily available kindling material, such as paper, in a safe, convenient manner.

It is another object to provide a portable outdoor charcoal stove or grill with means for kindling the charcoal in the grill quickly and safely using any available kindling material.

Another object is to provide a charcoal stove or grill in combination with structure for kindling the charcoal, whereby the kindling process can be repeated quickly and safely as many times as desired, even while the charcoal is ignited.

Another object is to provide a charcoal stove grill in combination with structure for kindling the charcoal, whereby ignited charcoal in the grill can be readily extinguished, ashes removed and the charcoal ignited again in the grill, all without touching or handling the charcoal in the grill.

According to an embodiment of the present invention, a portable charcoal-burning food stove or grill is provided in combination with a structure for kindling the charcoal in the grill so that when the charcoal is kindled the grill can be removed or separated from the kindling structure and used in a conventional manner. The grill referred to herein as the Hibachi, is an upstanding, relatively shallow container for charcoal having closed sides, open at the top like a conventional Hibachi and also open at the bottom, the opening at the bottom being covered by a grate and charcoal is placed on the grate. The bottom of this Hibachi mates with the top of the kindling structure which is an enclosure tapering outward below the Hibachi and having a multitude of relatively uniformly spaced air passages throughout the side walls of the structure to provide air flow to kindling material therein. Upon igniting the kindling material, which may be paper, flames and hot gases therefrom flow up through the bottom of the Hibachi igniting the charcoal briquets. When the briquets are suitably ignited, the Hibachi can be removed from the kindling structure and set on its own legs on a table or stand and used in a conventional manner to grill food.

Clearly, the ignition process can be repeated several times, if necessary, to insure thorough ignition of the briquets. For example, after the kindling material in the kindling structure burns to ashes, the Hibachi can be removed from the structure, more kindling material added through the top of the structure, the Hibachi replaced on the structure and the kindling process repeated again. This facilitates reigniting the charcoal or igniting additional charcoal added to the Hibachi safely and quickly.

When the user is finished with the Hibachi the remaining charcoal briquets can be doused with water and the water will flow through the grate and out the bottom of the Hibachi onto the ground, removing all ashes from the briquets and leaving substantially unburned charcoal. The unburned charcoal dries quickly and can be used again and reignited using the kindling structure just as already described. Clearly, this is done without handling or removing the charcoal from the Hibachi and all ashes are removed (washed out by the water) from the Hibachi. Furthermore, the combination of Hibachi and kindling structure need not be more than a foot high and so can be easily used on a table. The Hibachi itself is a shallow structure and can be readily carried in a backpack or in the trunk of a small car and the kindling structure, as will be seen from the specific description included hereinbelow, can be made of sheet metal and may fold flat so that it also may be carried in a backpack or in the trunk of a small car.

The Hibachi and Kindling Structure can also be made as a unitary piece and so they may be unseparable. In that case the kindling may be inserted into the kindling structure from the top, through the Hibachi (after first removing the grates) or it may be inserted at the bottom of the kindling structure.

These objects and features of the present invention are all attributed to the particular embodiment of the invention described in detail hereinbelow. Other features, objects and advantages of the present invention will also be apparent in view of the specific description of that embodiment, taken in conjunction with the drawings.

DESCRIPTIONS OF THE DRAWINGS

FIGS. 5 and 6 are front side cross section views of the assembled combination of Hibachi and kindling structure to show details of construction thereof;

FIG. 7 is a top view of the Hibachi showing the open bottom covered by grates and the grill holders;

FIG. 8 is a bottom view of the Hibachi showing the open bottom; and

FIGS. 9 and 10 show a suitable construction of the kindling structure.

DETAILED DESCRIPTION OF AN EMBODIMENT OF THE INVENTION

Figures 1, 2:
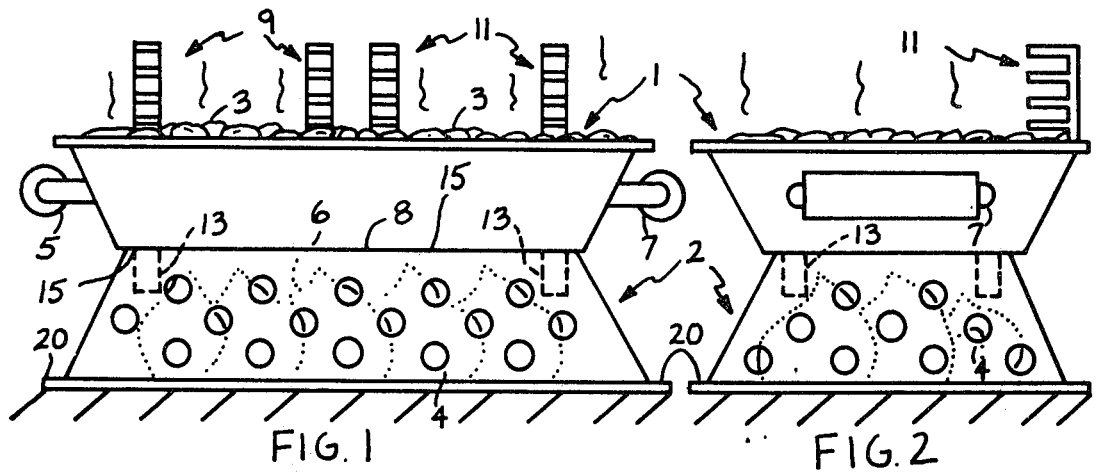
FIGS. 1 and 2 are front and side views respectively of the assembled Hibachi and kindling structure with kindling in the structure ignited and burning to kindle charcoal in the Hibachi.
Figures 3, 4:
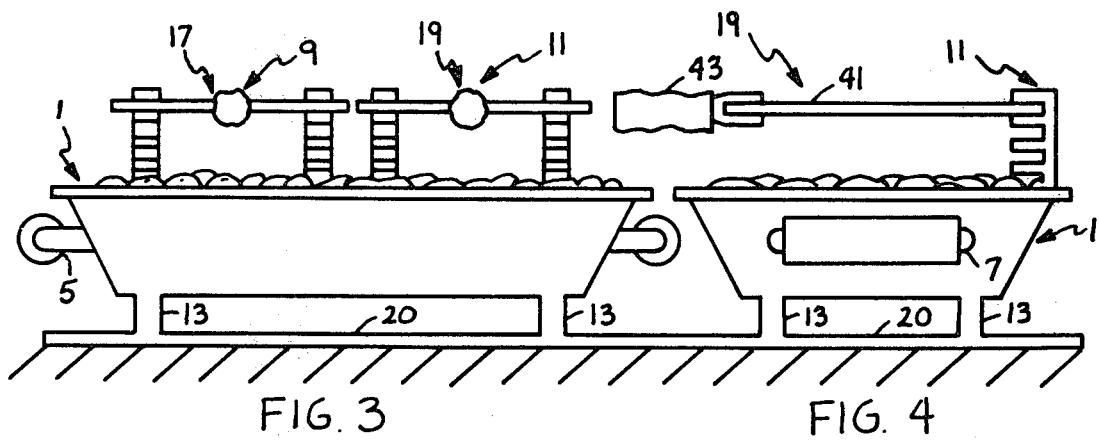
FIGS. 3 and 4 are front and side views, respectively, of the Hibachi containing ignited charcoal following the kindling process, with grills inserted in grill holders, in readiness for cooking.

FIGS. 1 and 2 are front and side views showing the combination of Hibachi and kindling structure, the Hibachi containing charcoal and the kindling structure containing kindling, such as wads of paper, which are ignited to kindle the charcoal. The Hibachi 1 is essentially an upstanding, relatively shallow container for charcoal 3. It has handles 5 and 7 on opposite sides and two pairs of grill holders 9 and 11 for holding grills for grilling food as shown in FIGS. 3 and 4. In addition, the Hibachi has four legs, all denoted 13, extending from the bottom of the Hibachi so that it can stand on a table by itself as illustrated by FIGS. 3 and 4.

The kindling structure 2 is a four-sided enclosure open at the top and on which the Hibachi sets (if separable therefrom) when kindling the charcoal. The kindling enclosure preferably tapers outward from top to bottom as illustrated and the four sides are equipped with a multitude of air holes, substantially uniformly spaced as shown. These air holes, denoted generally 4, allow air flow into the kindling structure to support combustion of kindling material 6 that may be balls or wads of paper, that are loaded into the kindling structure from the top before the Hibachi is placed on top of the structure as is described hereinbelow with references to FIGS. 5 through 8. The bottom of the Hibachi is open and this open bottom is covered by a gate on which the charcoal briquets 3 are placed. Furthermore, the Hibachi rests on the kindling structure, as shown in FIGS. 1 and 2, with the top edge 8 of the kindling structure mating with the bottom outside periphery 15 of the Hibachi and so gas and flame generated by the burning kindling material 6 in the kindling structure flow upward through the opening in the bottom of the Hibachi, through the grate and envelope the charcoal 3, igniting the charcoal.

The kindling material 6 may be any suitable combustible material, and particularly, it may be paper such as wads of newspaper crumpled up into balls and dropped into the kindling structure from the top. Such kindling material burns quickly, producing an abundance of flame and hot gases that quickly, thoroughly, and safely ignite the charcoal briquets. This kindling process can be repeated as often as desired or necessary. For example, after the kindling material has burned to ashes, it is only necessary to lift the Hibachi off the kindling structure, drop more kindling material into the structure, replace the Hibachi on the kindling structrue and ignite the added kindling material. Clearly, this process can be repeated as many times as desired and is quite safe to do even while there are live coals among the charcoal briquets. When the briquets are kindled to the satisfaction of the user, the Hibachi can be lifted by the handles 5 and 7 from the kindling structure and placed on a flat surface, such as a sheet of metal 20 as illustrated by FIGS. 3 and 4. Then, the grills 17 and 19 are attached, cantilever fashion, as shown, to the grill holders 9 and 11 and food to be cooked is then placed on the grills and the cooking process commences.

While cooking food on the grills, the Hibachi rests on a metal sheet like sheet 20 or it rests on the ground and so ashes from the burning charcoal or drippings from the food fall through the grate at the bottom of the Hibachi on the sheet 20 or on the ground.

Later, even while some of the charcoal briquets may be red hot, additional charcoal may be added to the Hibachi and the ignition process repeated again easily and safely. This is done by again loading the kindling structure 2 with kindling such as wads of paper, placing the Hibachi on top of the kindling structure as shown in FIGS. 1 and 2 and lighting the kindling through one of the holes.

When the user is finished with the Hibachi, any unburned charcoal can be saved for future use by placing the Hibachi on the ground and dousing it with water from the top. This will extinguish the charcoal that is burning and wash all ashes out of the Hibachi through the opening at the bottom onto the ground. The unburned charcoal remaining on the grate can be left where it is and the Hibachi set aside until it is needed again. When used again, more charcoal may be added to the Hibachi and the kindling process is performed.

If it is intended to use the Hibachi on a table or on a surface which could be marred should hot coals or ashes fall upon the surface, then it is recommended that a metal sheet 20 be provided along with the Hibachi and kindling structure to be placed beneath the kindling structure as shown in FIGS. 1 and 2 during the kindling process, and placed beneath the Hibachi as shown in FIGS. 3 and 4 during the cooking process, when the Hibachi is used separate from the kindling structure. Thus, this sheet becomes a useful third part used in combination with the Hibachi and kindling structure. On the other hand, if it is only intended to use the Hibachi on the ground or on surfaces where no care has to be taken to protect the surface from ashes and hot coals, then the sheet 20 can be dispensed with.

The Hibachi is illustrated in detail by FIGS. 5 through 8. The body of the Hibachi is preferably a casting. For example, it may be cast of iron, steel, or aluminum and this casting is a single unitary piece including side walls 23 that slope inwardly from the top to the bottom of the Hibachi, outward extending top edge 21, a bottom shelf 25 that runs completely around the bottom of the Hibachi, legs 13 and a centrally located reinforcing rib 27, spanning the open bottom 29 of the Hibachi. The shelf 25 at the bottom of the Hibachi supports the grates 29 that rest on the shelf. Where a rib like 27 is provided, then it is convenient to provide two grates, one on each side of the rib resting on shelf 25. The legs 13 extend from the bottom of the shelf from the outside bottom surface 15 thereof and that same surface mates with the top edge 8 of the kindling structure with surface 15 mating with the edge 8, the legs 13 project downward inside the kindling structure as shown particularly by FIGS. 5 and 6.

The grill holders 9 and 11 may each be made in a unitary piece to provide a pair of grill holders for holding a single grill. The grill holder may be a casting of the same material as the body of the Hibachi and attached to the body by bolts and nuts such as 33 through accommodating holes in the holder and Hibachi. The handles 5 and 7 may each be made in two parts, a yoke 35 and a wooden dowel 37. The yoke 35 may also be a casting and attached by bolts and nuts such as 39 through accommodating holes in the yoke and the Hibachi, and the wooden dowel 37 secured to the yoke by screws 41. The grills 17 and 19 may be of conventional design such as used in any conventional Hibachi and made up of a grill portion 41 that engages a holder, 9 or 11, and a wooden or thermally insulated handle 43.

The kindling structure need not be made of as heavy construction as the Hibachi. It is not subject to as high a temperature nor for as prolonged a period as the Hibachi. Hence, the kindling structure can be made of sheet metal or other light weight, heat resistant material, or, it can be cast of the same material as the Hibachi. Furthermore the separate kindling structure can be made to disassemble quickly or to fold up or collapse for easy storage. One suitable construction of the kindling structure is illustrated by FIGS. 9 and 10. In this illustration, the four sides of the structure are made of four separate pieces of sheet metal in which the air holes 4 are punched. The front and back sheets such as 10 may be identical and the side sheets such as 12 may also be identical. All sheets are punched with holes 4.

The front and back sheets like 10 have short returns such as 14 at each end to accommodate fastening the side sheets. The fastening may be by bolts and nuts or studs like 16 attached to the returns mating with holes and slots like 18 in the side sheets may be provided for quick assembly or disassembly of the side sheets with the front sheets.

When disassembled the sheets may be stacked easily and stored as a substantially flat package. Clearly other constructions of the kindling structure may be employed so that it disassembles or folds into a flat package for ready storage.

The embodiment of the present invention described hereinabove represents at present the best known use of the invention. This embodiment is described in detail with regard to all parts, the interrelationship between the parts and the materials of which the parts can be made. However it should be recognized that certain modifications in size, configurations, arrangements and materials other than those described herein will occur to one skilled in the art. Hence it is intended that the appended claims cover those variations. For example the Hibachi and kindling structure may be made as a single unitary casting and so be inseparable.

What is claimed is:
1. A portable Hibachi-type charcoal burning food grill in combination with a structure for kindling the charcoal therein comprising,
   (a) an upstanding, shallow dish-like casting which is a container for charcoal having outwardly sloping sides from the bottom to the top thereof, at least one large opening through the bottom and legs extending downward from said bottom for supporting said container on a flat surface with the open bottom thereof spaced above the flat surface,
   (b) a grate in the container at the bottom thereof covering the bottom opening which together with the sloping sides contains the charcoal,
   (c) a kindling structure having closed sides and readily separable from the dish container below the dish container for supporting the container and which defines an enclosure below the container of relatively larger volume than the shallow container for containing burning kindling material,
   (d) the top of the kindling structure snugly fitting the bottom of the container around the grate and around the container legs,
   (e) the top and bottom of the kindling structure being open so that the structure forms an upstanding combustion chamber and funnel to the grate and
   (f) a multitude of air passages through the sides of the kindling structure providing air flow to kindling materials therein,
   (g) whereby kindling material placed in the structure and ignited, burns rapidly to ignite charcoal placed in the container on the grate.
2. The combination as in claim 1 wherein, the air passages are substantially evenly distributed throughout the sides of the kindling structure.
3. The combustion as in claim 2 wherein,
   (a) the kindling structure tapers outward from the top to the bottom thereof and
   (b) a perimeter surface is provided at the bottom of the charcoal container, encircling the bottom opening thereof outside of the legs, and mates with the top of the kindling structure to funnel gas flow from the structure into a container through the bottom thereof.
4. The combination as in claim 1 wherein,
   (a) the kindling structure tapers outward from the top to the bottom thereof.
5. The combination as in claim 1 wherein,
   (a) a perimeter surface is provided at the bottom of the charcoal container, encircling the bottom opening thereof outside of the legs, and mates with the top of the kindling structure when the container rests on the structure to funnel gas flow from the structure into the container at the bottom thereof.
6. The combination as in claim 5 wherein, there are
   (a) at least three of said legs attached to the bottom of the charcoal container within said perimeter for supporting the container on a flat surface with the open bottom of the container spaced above the flat surface.
7. The combination as in claim 6 wherein,
   (a) the kindling structure tapers outward from the top to the bottom thereof.
8. The combination as in claim 1 wherein the kindling structure is made of sheet metal.

* * * * *